(No Model.)

W. H. MORGAN.
ROLLER BRAKE.

No. 602,996. Patented Apr. 26, 1898.

Witnesses.
Cruse Watson
Geo S Frank

Inventor.
Wm. H. Morgan.

UNITED STATES PATENT OFFICE.

WILLIAM H. MORGAN, OF PEABODY, KANSAS.

ROLLER-BRAKE.

SPECIFICATION forming part of Letters Patent No. 602,996, dated April 26, 1898.

Application filed March 24, 1897. Serial No. 629,105. (No model.)

*To all whom it may concern:*

Be it known that I, WILLIAM H. MORGAN, a citizen of the United States, residing at Peabody, in the county of Marion and State of Kansas, have invented new and useful Improvements in Wheel-Brakes, of which the following is a full, clear, and exact description, such as will enable others skilled in the art to which it appertains to make and use the same.

The object of this invention is to provide efficient means for applying a round or wheel brake to the outer rim or tire of any wheel that it is intended to retard in a manner that will confine any necessary friction within the wheel-brake and avoid friction or rubbing together of the peripheries of the two wheels.

I provide a brake, consisting of a wheel or wheels with double rims, which when used to retard another wheel shall be pressed against the outer tire or periphery thereof. The brake-wheel is retarded by means within itself, as hereinafter explained, and the novel features thereof will be specifically defined by the appended claim.

The invention is illustrated in the accompanying drawings, which, with the letters of reference marked thereon, form a part of this specification, and in which—

Figure 1:
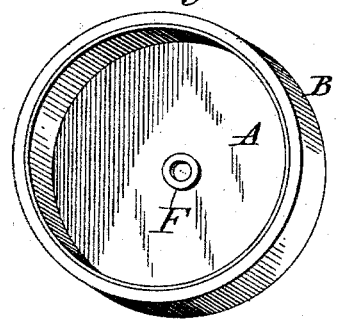
Figure 2:
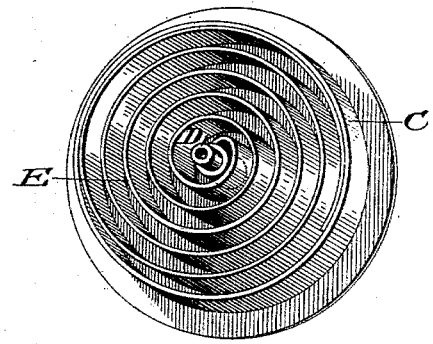
Figure 4:
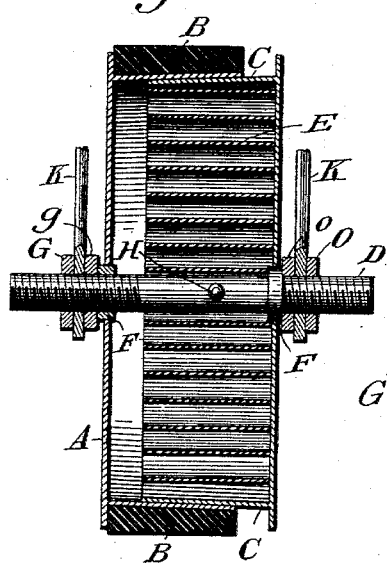
Figure 3:
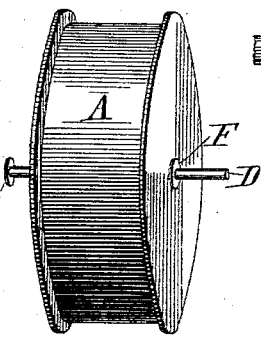
Figure 5:
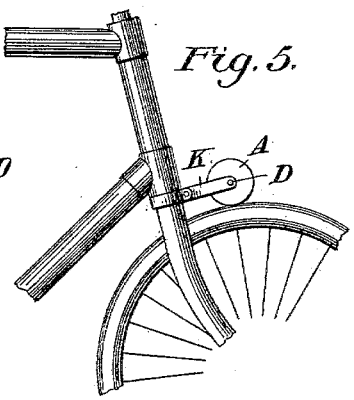

Figure 1 is a view of one round side or end of the brake with the outer rim and tire. Fig. 2 is a view of the other side or end of the brake with the inner rim. Fig. 3 is a front view of the brake with the two rims telescoped together. Fig. 4 is a sectional view of the brake and its relation to its carrier.

Like letters of reference indicate like parts throughout the several views.

In Fig. 1 is shown the outer rim A, fastened to the round side or end of the brake.

B represents the outer tire or periphery, which is to contact with the tire of the wheel to be retarded. The tire B is fastened to the outer rim A.

F represents a small steel thimble or reinforcing-ring which is made to best resist the wearing of the brake upon its axle.

In Fig. 2 is shown the inner rim C, fastened to the other round side or end of the brake, and the inner rim C is connected with a fixed axle D by means of a spring E.

Fig. 3 shows the two rims telescoped together and without the outer tire. In this figure A again represents the outer rim. The axle D has a screw-thread upon each end adapted to receive nuts G.

Fig. 4 shows a sectional view of the parts assembled. A represents the outer rim telescoped partly over and inclosing the inner rim C. The tire B is outside of and attached to the rim A. D is the axle, upon which the brake revolves, the point of contact being the steel thimbles F. The coiled spring E has its outer end attached to the rim C and its inner end attached at H to the axle D. Two nuts *g* and *o* are screwed on the axle up against the thimbles F and sufficiently snug to make the two rims A and C press each other in contact. Between the inner nuts *g* and *o* and the outer nuts G and O are two arms K of a frame which holds the brake. The outer nut G is screwed very tightly against this frame and presses it hard against the nut *g*. The outer nut O also presses the other arm of the frame tightly against the inner nut *o*. Thus by these check-nuts the axle is firmly held in the frame and prevented from turning.

In practice the brake-wheel is pressed against the periphery of the wheel to be retarded and the tires of both engage and move together without rubbing. The outer rim A also moves with its tire B. The inner rim C moves with the outer rim A so long as the friction between them is greater than the tension of the coiled spring within, which is being wound about the fixed axle. When the brake is applied, this coiled spring commences gently and without shock to wind up, and each succeeding turn of the brake-wheel winds it tighter, rapidly increasing the tension of the spring until the said tension exceeds the friction between the two rims A and C. Then the brake will have reached the limit of its retarding power, and if pressure be continued the rim A, with its tire B, will slip (with difficulty) about the rim C, now held back by the wound-up spring.

The utility of this invention is obvious, it being intended to prevent any possibility of unnecessary wearing of tires while using the brake.

The two rims are very slightly tapered, the outer rim A being a little smaller in diameter where it is fastened to its end or side of the brake than across its open side, and the inner rim C being smallest in the diameter of its open side. When the two parts are first put together for use, the inner rim C is made so large that it cannot be pressed its full width into the outer rim A; but in use the friction between the two rims causes a slight wearing away and the two will gradually telescope closer together. Provision is made for this wearing process by so adjusting the nuts on the axle of the brake as to keep the two rims in constant pressure together, and when the wearing away shall be so much as to allow the inner rim to enter its full width in the outer rim, then a thin strip of metal is placed between the two rims and the same process gone over until either rim shall be worn out.

The use of the fixed axle, the brake-wheel revolving on the same and being retarded by the coiled spring within, and other methods of mounting the brake are described and shown in Patent No. 577,404, issued to me under date of February 16, 1897.

I am aware that other roller-brakes have been invented having provision for friction within them; but my application of the spring E overcomes any uneven jerking of the brake and with the friction between the two rims permits continuous use of the brake, as in descending a long incline. Again, my means of regulating the limit of power of the brake by limiting the tension of the spring by means of the check-nuts upon the axle will often prove beneficial.

What I claim as new, and desire to secure by Letters Patent, is—

The combination in a brake-wheel of two rims, telescoping, one within the other, the rims tapering so that the closer they are adjusted together the greater the friction between them; means for thus adjusting them by nuts and check-nuts on the axle; a coiled spring, the inner rim being connected with the fixed or non-revolving axle by the said spring; the outer rim covered with a periphery suitable to engage the periphery of the wheel it is intended to retard, substantially as described.

In testimony whereof I have signed this specification in the presence of two subscribing witnesses.

WILLIAM H. MORGAN.

Witnesses:
 H. B. WATSON,
 GEO. S. FUNK.